United States Patent
Freire et al.

(10) Patent No.: US 12,143,058 B2
(45) Date of Patent: Nov. 12, 2024

(54) VOLTAGE CONTROL OF A DC-LINK

(71) Applicant: Siemens Gamesa Renewable Energy A/S, Brande (DK)

(72) Inventors: Nuno Miguel Amaral Freire, Brande (DK); Tao Wang, Sheffield (GB); Zi-Qiang Zhu, Sheffield (GB)

(73) Assignee: Siemens Gamesa Renewable Energy A/S, Brande (DK)

( * ) Notice: Subject to any disclaimer, the term of this patent is extended or adjusted under 35 U.S.C. 154(b) by 0 days.

(21) Appl. No.: 17/925,720

(22) PCT Filed: May 7, 2021

(86) PCT No.: PCT/EP2021/062159
§ 371 (c)(1),
(2) Date: Nov. 16, 2022

(87) PCT Pub. No.: WO2021/239441
PCT Pub. Date: Dec. 2, 2021

(65) Prior Publication Data
US 2023/0246577 A1    Aug. 3, 2023

(30) Foreign Application Priority Data
May 27, 2020   (EP) .................................... 20176906

(51) Int. Cl.
*H02P 9/00*   (2006.01)
*F03D 7/02*   (2006.01)
(Continued)

(52) U.S. Cl.
CPC .......... *H02P 9/102* (2013.01); *F03D 7/0284* (2013.01); *H02P 9/02* (2013.01); *F05B 2270/337* (2013.01)

(58) Field of Classification Search
CPC .......... H02P 9/102; H02P 9/02; F03D 7/0284; F05B 2270/337; Y02E 10/76
See application file for complete search history.

(56) References Cited

U.S. PATENT DOCUMENTS

2011/0140438 A1* 6/2011 Delmerico .............. H02J 3/381
290/55

OTHER PUBLICATIONS

J. Zhang, T. Sun, F. Wang, J. Rodriguez, and R. Kennel, "A computationally efficient quasi-centralized dmpc for back-to-back converter pmsg wind turbine systems without dc-link tracking errors," IEEE Trans. Ind. Electron., vol. 63, No. 10, pp. 6160-6171, May 30, 2016.

(Continued)

*Primary Examiner* — Julio C. Gonzalez
(74) *Attorney, Agent, or Firm* — Schmeiser, Olsen & Watts LLP (57) ABSTRACT

An a arrangement for controlling a DC-link-voltage of a DC-link connected between a generator side converter portion and a utility grid side converter portion of a wind turbine includes: a generalized predictive control module adapted: to receive as control module input values a current value of the DC-link-voltage and a reference value of the DC-link-voltage and to derive a reference value of a DC current based on the control module input values, the reference value of a DC current defining the DC current to be injected into the DC-link, wherein the arrangement is adapted to control the generator side converter portion and/or the utility grid side converter portion based on the reference value of the DC current.

11 Claims, 6 Drawing Sheets

(51) Int. Cl.
    H02P 9/02      (2006.01)
    H02P 9/10      (2006.01)

(56)            References Cited

OTHER PUBLICATIONS

L. Yin, Z. Zhao, T. Lu, S. Yang, and G. Zou, "An improved dc-link voltage fast control scheme for a pwm rectifier-inverter system," IEEE Trans. Ind. Appl., vol. 50, No. 1, pp. 462-473, Feb. 2014.
Mishra Rupa et al: "Development and implementation of control of stand-alone PMSG-based distributed energy system with variation in input and output parameters", IET Electric Power Applications, IET, UK, vol. 13, No. 10, Oct. 1, 2019 (Oct. 1, 2019), pp. 1497-1506, XP006082942.
Mishra Rupa et al: "Modelling and analysis of distributed power generation schemes supplying unbalanced and non-linear load", International Journal of Electrical Power & Energy Systems, Jordan Hill, Oxford, GB, vol. 119, Feb. 3, 2020 (Feb. 3, 2020), XP086121848.
Ralph Kennel, Arne Linder, Linke, M.; Generalized Predictive Control (GPC)—Ready for Use in Drive Applications?; 32nd IEEE Power Electronics Specialists Conference PELS, Vancouver, Canada, Jun. 17-22, 20012.
International Search Report and Written Opinion of the International Searching Authority mailed on Jul. 8, 2021 for application No. PCT/EP2021/062159.

\* cited by examiner

VOLTAGE CONTROL OF A DC-LINK

CROSS-REFERENCE TO RELATED APPLICATIONS

This application claims priority to PCT Application No. PCT/EP2021/062159, having a filing date of May 7, 2021, which claims priority to EP Application No. 20176906.4, having a filing date of May 27, 2020, the entire contents both of which are hereby incorporated by reference.

FIELD OF TECHNOLOGY

The following relates to an arrangement for controlling a DC-link-voltage of a DC-link connected between a generator side converter portion and a utility grid side converter portion of a wind turbine. The following further relates to a wind turbine and further relates to a method of controlling a DC-link-voltage of a DC-link of a wind turbine.

BACKGROUND

A wind turbine comprises a rotor at which plural rotor blades are connected, wherein the rotor is mechanically coupled to an electric generator, for example a synchronous generator which generates AC power upon rotation of the rotor. A conventional wind turbine further comprises a generator side converter portion connected to the generator, a DC-link connected to the DC output terminals of the generator side converter portion and further comprises a grid side converter portion connected with its DC terminals to the DC-link and which is connected or connectable via its AC output terminals to a utility grid, optionally via one or more transformers. The DC-link comprises a capacitor which is connected between the two DC buses. During operation of the wind turbine, the rotational speed of the rotor may change due to changing wind conditions. Furthermore, there may be transient disturbances in the utility grid for example regarding voltage or frequency. These influences influence the voltage across the DC-link.

Stable DC-link voltage is important for the high-performance operation of a wind power generation system, since the DC-link voltage fluctuation can influence the life of the DC-link capacitor, and cause current harmonics on both the machine side and the grid side To achieve the stable DC-link voltage, good disturbance rejection capability is crucial for the DC-link voltage controller. When controlling the DC-link voltage on the machine side, the main disturbances are the changes of the generator speed and the active power drawn by the grid side. When controlling the DC-link voltage on the grid side, the main disturbances are the changes of the grid voltage condition (amplitude, frequency, unbalance, harmonic, etc.) and the active power injected by the machine side.

Conventionally, a proportional-integral (PI) controller has been used for DC-link-voltage control. Therein, the PI-controller may use the DC-link-voltage error as an input and may produce a DC power reference. The DC power reference may conventionally have been converted into a current reference and may have been converted to a voltage reference which is supplied to one of the converters as a control signal.

It has however been observed that the conventional control scheme has relatively low disturbance rejection capability, i.e., relatively low capability to handle or reject a disturbance, for example regarding voltage at the grid side or rotational speed at the generator side. Also, changing the coefficients of the integral portion of the PI-controller may be not appropriate since the control error can only be gradually eliminated by the integrating process. Large integral coefficients may speed up the transient processes and improve the disturbance rejection capability, but overshoot is more likely to appear when the DC-link-voltage reference changes and the system stability is reduced.

Also other conventionally used methods, including finite-control-set model predictive control (FCS-MPC) has some drawbacks, in particular regarding the generation of the switching signals leading to unfixed switching frequency of the converter and thus the AC current is distorted by harmonics that are distributed on a wide frequency band. Furthermore, the finite control set model predictive control suffers from static control error caused by parameter mismatches unless extra auxiliary controllers are utilized.

Furthermore, a conventionally used dead-beat predictive DC-link-voltage control has also drawbacks in that it requires the fast and accurate DC load power estimation and feedforward which is usually difficult and undesired in a practical system. Furthermore, the deadbeat predictive control suffers from the static control error caused by parameter mismatches. Furthermore, a fixed-step gradually approaching manner makes the DC-link-voltage control rigid, since all the different transient processes are forced to last the same period.

Thus, there may be a need for an arrangement and for a corresponding method of controlling a DC-link-voltage of a DC-link connected between a generator side converter portion and a utility grid side converter portion of a wind turbine, wherein the aforementioned problems are at least partly overcome. There may in particular a need for a control method and arrangement, wherein the disturbance rejection capability is improved, while the DC-link-voltage may be reliably kept at a desired value.

SUMMARY

According to an embodiment of the present invention it is provided an arrangement for controlling a DC-link-voltage of a DC-link connected between a generator side converter portion and a utility grid side converter portion of a wind turbine, the arrangement comprising: a generalized predictive control module adapted: to receive as control module input values a current value of the DC-link-voltage and a reference value of the DC-link-voltage and to derive a reference value (e.g. $I^*\_DC$) of a DC current (e.g. in a static coordinate frame) based on the control module input values, the reference value of a DC current defining the DC current to be injected into the DC-link, wherein the arrangement is adapted to control the generator side converter portion or the utility grid side converter portion based on the reference value of the DC current (e.g. $I^*\_DC$).

The arrangement may be implemented for example as a software and/or hardware module e.g. in a controller of the wind turbine. The DC-link may comprise a first DC bus and a second DC bus, wherein between the two DC buses, a capacitor or a capacitor system is connected. The DC-link may comprise further components such as a switch which may be connected in parallel to the capacitor in order to discharge the voltage in case of overvoltages for example. The switch may be configured as a controllable switch, such as a power transistor. Thereby, energy may also be discharged in particular situations for example during transient overvoltages.

The generator side converter portion may be configured as an AC-DC converter which is capable of converting an AC power into a DC power. The generator may for example comprise a permanent magnet synchronous generator comprising stator windings and a rotor comprising permanent magnets. The rotor may be connected to plural rotor blades which are driven by impacting wind.

The utility grid side converter portion may be configured as a DC-AC converter capable to convert the DC power to a fixed frequency AC power which is eventually to be supplied to the utility grid, optionally via one or more transformers. The AC power of the generator or the utility grid side converter portion may in particular be implemented as three-phase AC power- Generalized predictive control (GPC) may generate a sequence of (future) control signals within each sampling interval to optimize the control effort of the controlled system. This may be performed by minimizing a (complex) cost function. Due to the high calculation power required for GPC, this control method has not been applied to the control of a DC-link-voltage. GPC may belong to the group of "long-range predictable controllers" and may generate a set of future control signals in each sampling interval but only the first element of the control sequence is applied to the system input. The GPC may be based or may include a physical/mathematical model of the process to be controlled.

Compared with conventional PI controllers, the main characteristic of GPC is that the control problem is transformed into an optimization problem by predicting the future states of the controlled plant, and the prediction and optimization are done in every control interval. On the contrary, PI controllers use the past control errors to produce the control signal, without any prediction or optimization processes.

The arrangement may be configured to derive a reference value of the DC current from which respective reference currents (in particular AC currents) of the stator current or the grid current may be derived. The stator current may be or relate to the current flowing through stator windings of the generator which in turn flows through the generator side converter portion and then to the DC-link. The grid current may be or relate to the current flowing through grid which in turn flows through the grid side converter portion and from there to the DC-link.

According to an embodiment of the present invention, the generalized predictive control module comprises a physical model of the generator side converter portion, the DC-link and the grid side converter portion. The model may derive the change of the DC voltage as a function of the actual value of the DC current being injected into the DC-link and a disturbance current. Thereby, for example, the model may be based on a differential equation relating the change of the voltage across the capacitor of the DC-link to the injected current and the disturbance current. A conventional PI-controller does not comprise such a physical/mathematical model. The current value of the DC-link-voltage may be a measured value for which the arrangement may comprise a measurement sensor or measurement arrangement. The reference value of the DC-link-voltage may be pregiven. The reference value of the DC-link voltage is predefined according to the voltage level of the generator and the grid voltage that the grid side converter is connected to.

The reference value (for example $I^*\_DC$) may for example relate to the DC-current in a static coordinate frame, i.e., in a frame which does not rotate. Internally, the generalized predictive control module may, for deriving the reference value of the DC current, perform calculations regarding prediction of an increment and/or an actual value of the voltage across the DC-link. This prediction may be performed across a prediction horizon (for example N time steps). Furthermore, the generalized predictive control module may comprise a definition of a cost function which takes as an input the plural predicted values across the prediction horizon and is optimized or minimized by the generalized predictive control module. Upon minimization, the best reference value of the DC current may be found which may minimize the cost function across the prediction horizon. When the prediction is across a prediction horizon, the control may be improved and the voltage may be complying with a reference DC voltage. The reference value of the DC current may serve as a signal from which finally a control signal may be derived with which one of the converter portions is controlled depending on the particular application.

To use the machine side converter portion or the grid side converter portion to control the DC-link voltage is determined by the general design of the control structure of the whole turbine, and both of these two options are applied in products and research. If the machine side converter portion is used to control the DC-link voltage, the maximal power point tracking (MPPT) should be achieved by the grid side converter portion by adjusting the active power injected into the unit grid according to the output of the MPPT module. On the contrary, if the grid side converter portion is used to control the DC-link voltage, the MPPT should be achieved by the machine side converter portion by adjusting the rotor speed or the active power extracted from the turbine according to the MPPT module.

Depending on which of the converter portion is controlled, an actual value of the DC current may flow from the respective converter portion to the DC-link, i.e., to the capacitor connected between the DC buses of the DC-link. When the generalized predictive control module is utilized for controlling the DC-link-voltage, the transient rejection capability may be improved while achieving a desired DC voltage across the DC-link.

According to an embodiment of the present invention, the arrangement further comprises an arithmetic element receiving as arithmetic element input values at least: the reference value (e.g. $I^*\_DC$) of the DC current; a current value (e.g. $V\_DC$) of the DC-link-voltage; the arithmetic element being adapted to calculate a q-component (e.g. $I^*\_sq$) of the reference value of the stator current or a d-component (e.g. $I^*\_gd$) of the reference value of the grid current in a synchronous reference frame (e.g. rotating synchronously with the electrical frequency of a generator connected to the generator side converter portion) based on the arithmetic element input values, in particular applying a power balance equation.

When a q-component or a d-component of the reference value of the stator current or grid current is calculated by the arithmetic element, calculation of the final control signal for the respective converter portion may be simplified. Thereby, in particular, a current controller may be utilized which then receives the reference of the stator current or grid current as a complex value or receives a difference between the complex reference value of the stator current or grid current and a measured value of the stator current or grid current (e.g., transformed into a rotating coordinate system).

According to an embodiment of the present invention, if control of the generator side converter portion is performed, the arithmetic element input values further comprise: a pole pair number (e.g. $N\_p$); a mechanical rotational speed (e.g. $\omega r$) of the generator; a permanent flux linkage of the permanent magnets of the generator; wherein the arithmetic element is adapted to calculate the q-component (e.g. $I^*\_sq$)

of the reference value of the stator current or grid current in the synchronous reference frame, wherein the arrangement is adapted by additionally using a predetermined d-component (e.g. I*_sd) of the reference value of the stator current or grid current in the synchronous reference frame, to obtain a complex reference value (e.g. I*_sdq) of the stator current or grid current in the synchronous reference frame.

Thereby, it may be enabled to control the generator side converter portion appropriately. The pole pair number may relate to the number of pole pairs of the rotor of the generator. The permanent flux linkage of the permanent magnets may relate to the magnetic flux generated by the permanent magnets which are mounted at the rotor of the generator. The q-component of the reference value of the stator current may relate to achieving an appropriate power balance and may be relevant for controlling the voltage across the DC-link. The predetermined d-component of the reference value may for example be a fixed value, for example may be set to zero. The d-component may merely relate to reactive power which may not be required for controlling the DC-link-voltage. Thereby, controlling the DC-link-voltage by controlling the generator side converter portion may be enabled.

According to an embodiment of the present invention, if control of the grid side converter portion is performed, the arithmetic element input values further comprise: an amplitude of a grid voltage, wherein the arithmetic element is adapted to calculate the d-component (e.g. I*_gd) of the reference value of the grid current in the synchronous reference frame, wherein the arrangement is adapted by additionally using a predetermined q-component (e.g. I*_gq) of the reference value of the grid current in the synchronous reference frame, to obtain a complex reference value (e.g. I*_gdq) of the grid current in the synchronous reference frame.

In this embodiment, the d-component or the q-component of the reference value of the stator current or grid current may be the relevant quantity in order to control the DC-link-voltage. The predetermined q-component or d-component of the reference value of the stator current or grid current may be a fixed value, for example zero. Thereby, also depending on the application, control of the DC-link-voltage by controlling the grid side converter portion is enabled.

According to an embodiment of the present invention the grid side converter portion and the generator side converter portion are controlled simultaneously.

According to an embodiment of the present invention, the arrangement further comprises a current controller adapted: to receive as current controller input based on (a difference between) the complex reference value (e.g. I*_sdq) of the stator current or grid current in the synchronous reference frame and the complex measured value (e.g. I_sdq) of the stator current or grid current in the synchronous reference frame, and to calculate a reference value (e.g. V*_sdq) of a voltage as control signal for the generator side converter portion or the grid side converter portion.

The current controller may for example be implemented as a PI-controller which outputs the reference value of a voltage (e.g., in a synchronous reference frame) as control signal for the generator side converter portion or the grid side converter portion in order to minimize the difference between the complex reference value of the stator current or grid current and an (actual) value of the stator current or grid current in the respective synchronous reference frame. The reference value of the voltage may be supplied to the respective converter portion which may cause the respective converter portion to switch its power transistors such that the output voltage complies with the reference value of the voltage. Upon that, a particular value of the DC current will be injected to the DC-link according to the power balance equation and may for example be denominated as I_sdq (in the synchronous reference frame). The difference between the complex reference value, for example I*_sdq, and the actual value of the stator current or grid current transformed into the synchronous reference frame, i.e. I_sdq, may be supplied to the current controller. The current controller may derive its reference value of the voltage such that this difference is minimized. Internally, the current controller may comprise other control elements different from a PI-controller.

According to an embodiment of the present invention, the generator side converter portion or the utility grid side converter portion are adapted to receive the reference value of the voltage (e.g. V*_sdq, if generator side converter is controlled) as control signal, based on which plural controllable switches are operated, in order to inject a (current value of the) DC current to the DC-link corresponding to the complex reference value (e.g. I*_sdq) of the stator current or grid current in the synchronous reference frame.

Distinct voltage references may be provided to grid-side converter and generator-side converter depending on which converter portion is controlled. DC-link voltage control may be employed to either the grid-side converter or the generator-side converter but not both simultaneously.

In order to control the two converter sides, there is need to generate two sets of reference voltages: (1) V*sdq for gen-side converter; (2) V*gdq for grid-side converter.

If DC-link voltage control is on the generator side converter portion, only the generation of V*sdq is described in detail, whereas a second block diagram of a control method suitable to generate V*gdq will be as conventionally known.

If DC-link voltage control is on the grid side converter portion, only the generation of V*gdq is described in detail, whereas a second block diagram of a control method suitable to generate V*sdq will be as conventionally known.

The controllable switches of the converter portions may for example be configured as IGBT transistors. Pulse width modulation methodology may be employed for controlling respective gates of the power transistors. For example, a space vector pulse width modulation (SVPWM) method may be employed.

According to an embodiment of the present invention, the generalized predictive control module is adapted to apply a discrete prediction equation of the DC-voltage as a function of the current value (e.g. I_DC) of the DC current injected into the DC-link, a disturbance current (e.g. I_L) and a capacitance of a capacitor of the DC-link.

In particular, an incremental value and a value of the DC-link-voltage may be predicted across a prediction horizon, for example N time steps. The discrete prediction equation may employ a physical model or may be based on a physical law relating voltage and current across the DC-link capacitor. When for example the generator side converter portion is controlled, the current value of the DC current may be the current which is output by the generator side converter portion at its DC output terminals, and which flows towards the capacitor of the DC-link. Therein, the disturbance current may be the current which flows (as a part of the current flowing out of the generator side converter portion) to the utility grid side converter portion. A portion of the current value of the DC current flowing from the generator side converter portion may be a charging current which finally flows to the DC-link capacitor.

The disturbance current may be very large, which may be the main portion of the total current from the generator side.

The GPC does not require this disturbance current to be small, since the integrator embedded inside the GPC can automatically remove the impact of the disturbance current, thus the disturbance current (estimation or measurement) is not necessary in the GPC implementation.

Thereby, an implementation of the generalized predicted control module is achieved. The discrete prediction equation may be given in incremental form or in non-incremental form or in both in an incremental form and a non-incremental form. Using an incremental form of the discrete prediction equation may remove a DC voltage bias. The DC voltage may be predicted based on the previously unknown but finally optimized DC current. Thereby, the control of the DC-link-voltage may be improved.

According to an embodiment of the present invention, the generalized predictive control module is adapted to solve an optimization problem using a cost function, involving minimization of an error of the DC-link-voltage, wherein the solution is in particular obtained by applying quadratic programming theory using a matrix equation, wherein as solution a vector (e.g., AU) of increments (at different time steps) of the reference value of the DC current is obtained.

The cost function may be defined depending on the application. (For example, the tracking error of the reference (e.g., Y*−Y) and the incremental control effort (e.g., ΔU) are recommended to form the cost function by giving them different weighting factors. Other terms (e.g., the difference between the stator current or grid current and the corresponding stator current or grid current limitation) can also be added to the cost function, but the implementation of the generalized predictive control can be more complicated.

Quadratic programming may be a conventionally known technique for solving an optimization problem. Thereby, implementation may be simplified. The solution vector may comprise increments at different time steps of the reference value of the DC current.

According to an embodiment of the present invention, the generalized predictive control module comprises an accumulator being adapted to accumulate an element, in particular the first element of the solution vector of increments in order to obtain the reference value of the stator current or grid current (I*_DC). The summation may for example be performed as $1/(1-z^{-1})$ in the discrete implementation.

According to an embodiment of the present invention, the accumulator is adapted to perform a limitation such that the reference value (e.g., I*_DC) of the DC current is limited to lie within a predefined value range, in order to achieve AC current limitation to predefined AC current limits (of the generator stator currents or grid currents).

The limitation may advantageously also limit then quantities calculated later on, relating to the AC currents flowing in the respective converters or the generator stator. Thereby, it may be avoided that components of the wind turbine or components of a drive train towards the grid are damaged.

According to an embodiment of the present invention it is provided a wind turbine, comprising: a, in particular permanent magnet, synchronous generator mechanically coupled to a rotor at which plural rotor blades are mounted; a generator side converter portion, in particular AC-DC-converter, electrically connected to AC output terminals of the generator; a DC-link electrically connected to DC output terminal of the generator side converter portion; a grid side converter portion, in particular DC-AC-converter, having DC terminals electrically connected to the DC-link and having AC terminals electrically connectable to a utility grid; and an arrangement according to one of the preceding embodiments connected to control the generator side converter portion or the grid side converter portion.

In other embodiments, the arrangement may be employed in another energy production facility also comprising a DC-link.

It should be understood, that features, individually or in any combination, disclosed, described, explained or applied to an arrangement of controlling a DC-link-voltage of a DC-link may also be applied, individually or in any combination, to a method of controlling a DC-link-voltage of a DC-link connected between a generator side converter portion and a utility grid side converter portion of a wind turbine, according to embodiments of the present invention and vice versa.

According to an embodiment of the present invention it is provided a method of controlling a DC-link-voltage of a DC-link connected between a generator side converter portion and a utility grid side converter portion of a wind turbine, the method comprising: using a generalized predictive control module; receiving, by the generalized predictive control module, as control module input values a current value of the DC-link-voltage and a reference value of the DC-link-voltage; deriving, by the generalized predictive control module, a reference value (e.g. I*_DC) of a DC current (e.g. in a static coordinate frame) based on the control module input values, the reference value of a DC current defining the DC current to be injected into the DC-link; and controlling the generator side converter portion or the utility grid side converter portion based on the reference value of the DC current (e.g. I*_DC).

The aspects defined above and further aspects of embodiments of the present invention are apparent from the examples of embodiment to be described hereinafter and are explained with reference to the examples of embodiment. Embodiments of the invention will be described in more detail hereinafter with reference to examples of embodiment but to which the invention is not limited.

BRIEF DESCRIPTION

Some of the embodiments will be described in detail, with reference to the following figures, wherein like designations denote like members, wherein.

DETAILED DESCRIPTION

The illustration in the drawings is in schematic form. It is noted that in different figures, elements similar or identical in structure and/or function are provided with the same reference signs or with reference signs, which differ only within the first digit. A description of an element not described in one embodiment may be taken from a description of this element with respect to another embodiment.

Figure 1:
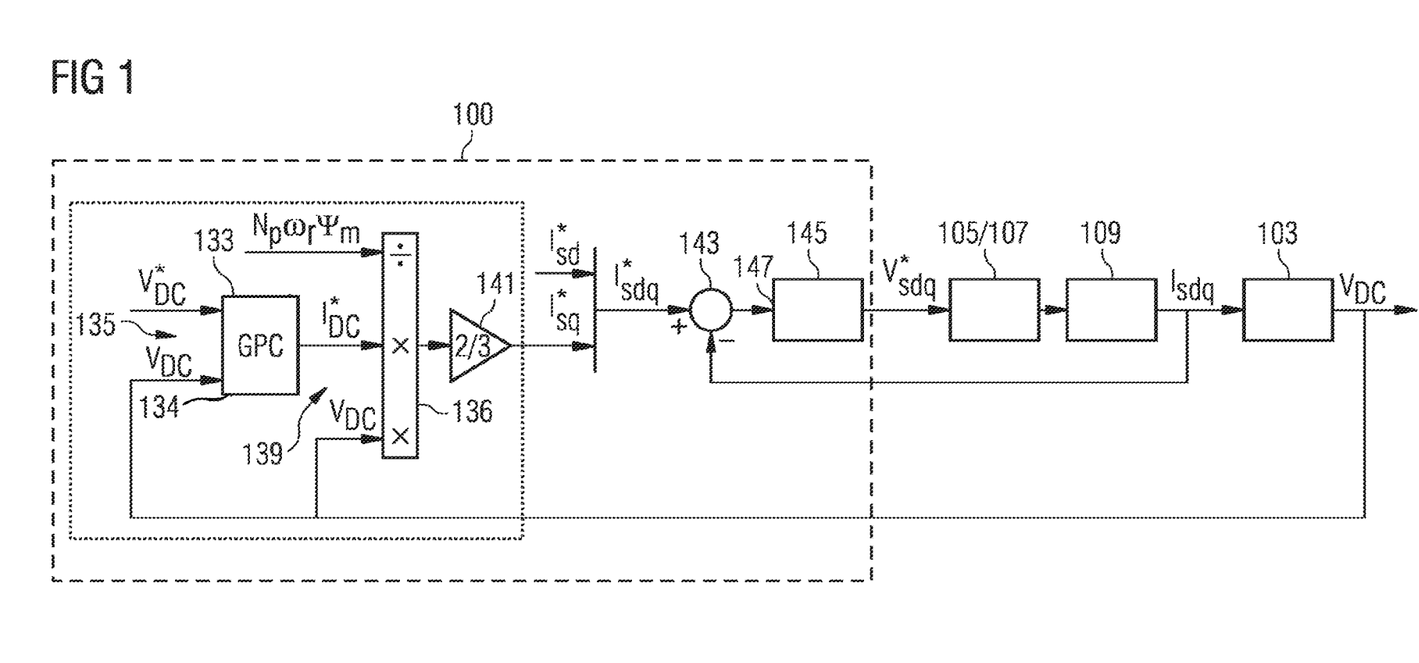
FIG. 1 schematically illustrates a control signal flow diagram of system including an arrangement for controlling a DC-link-voltage of a DC-link according to an embodiment of the present invention.

The system illustrated schematically in FIG. 1 (depicted as a signal flow scheme) comprises an arrangement 100 for controlling a DC-link-voltage of a DC-link 103 connected between a generator side converter portion and a utility grid side converter portion of a wind turbine.

Figure 2:
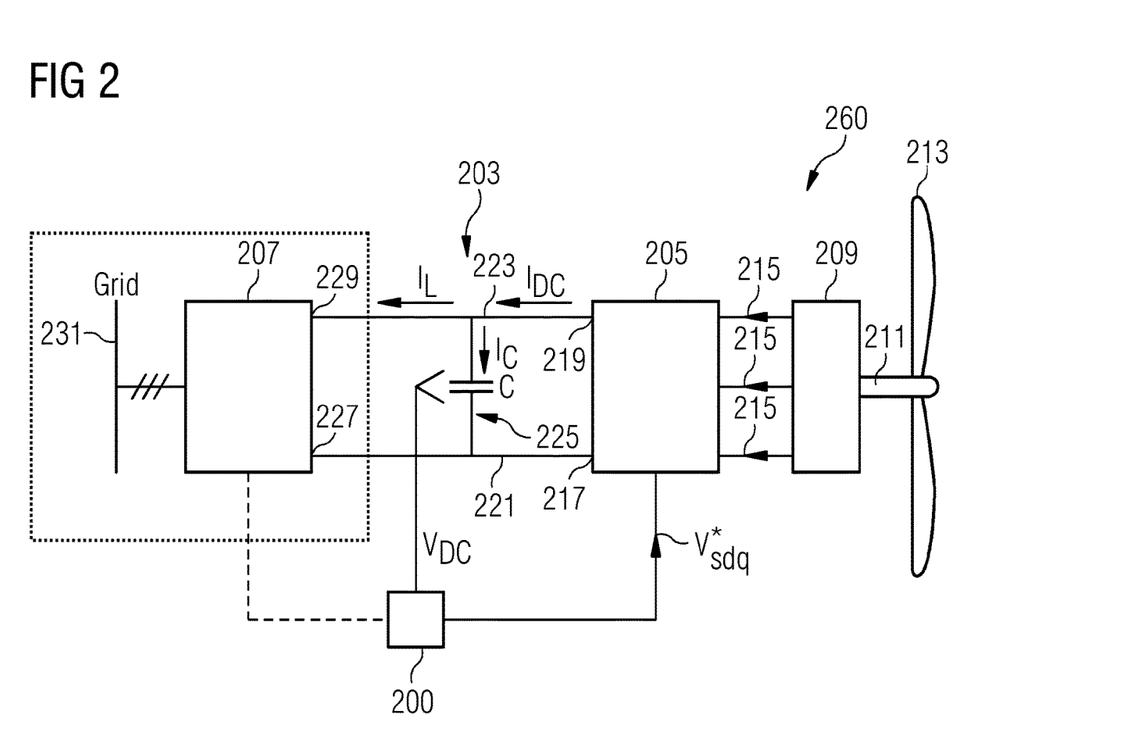
FIG. 2 schematically illustrates a wind turbine according to an embodiment of the present invention.
Figure 3:
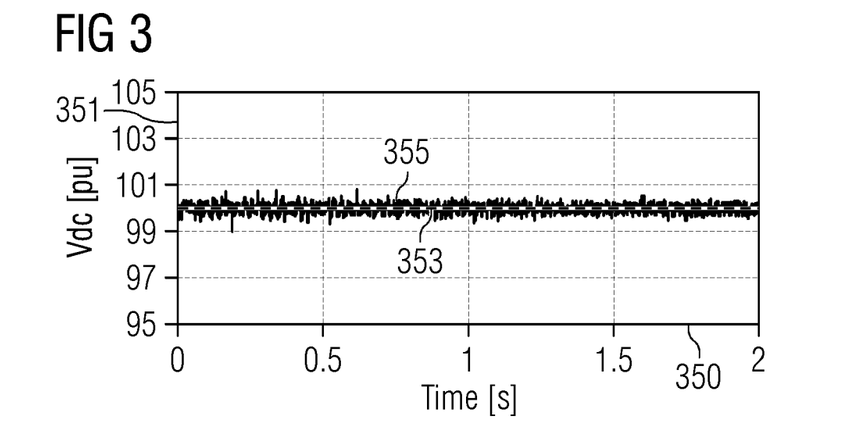
FIG. 3 schematically illustrates a coordinate system having as abscissa the time and as ordinate the voltage experimental results according to an embodiment of the present invention.
Figure 4:
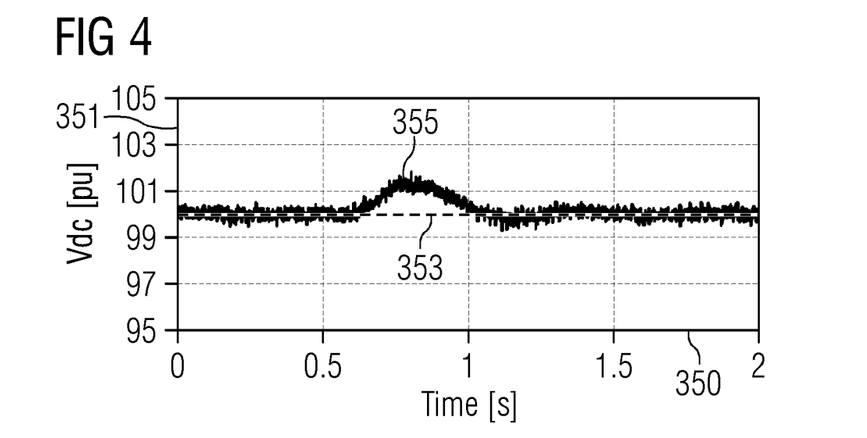
FIG. 4 schematically illustrates a coordinate system having as abscissa the time and as ordinate the voltage experimental results according to an embodiment of the present invention.
Figure 5:
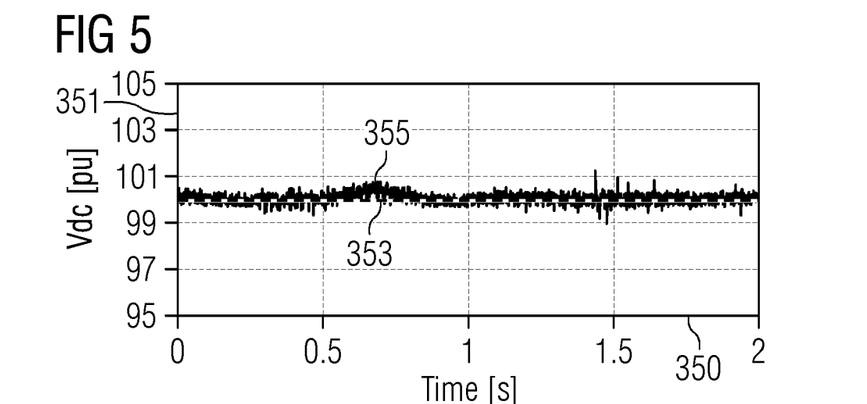
FIG. 5 schematically illustrates a coordinate system having as abscissa the time and as ordinate the voltage experimental results according to an embodiment of the present invention.
Figure 6:
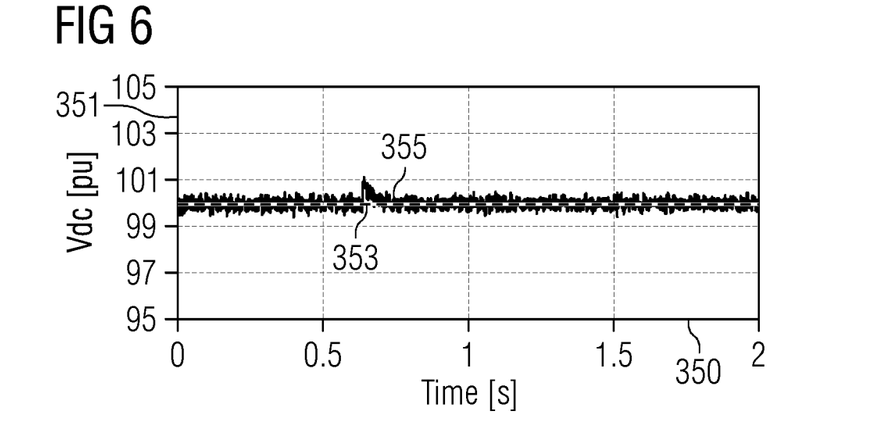
FIG. 6 schematically illustrates a coordinate system having as abscissa the time and as ordinate the voltage experimental results according to an embodiment of the present invention.
Figure 7:
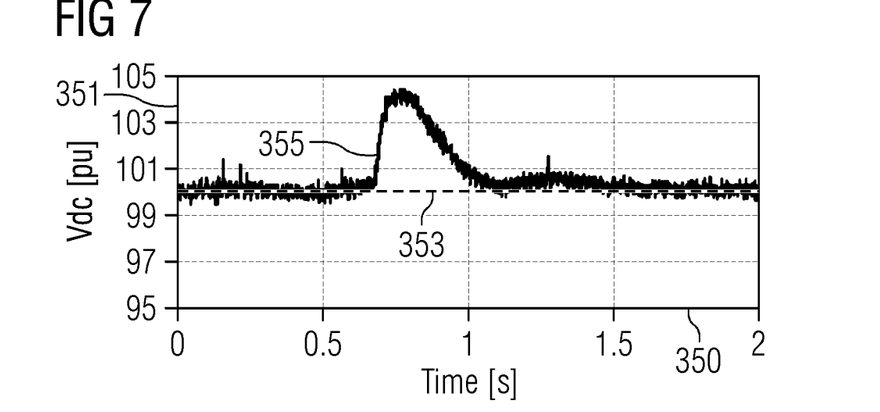
FIG. 7 schematically illustrates a coordinate system having as abscissa the time and as ordinate the voltage experimental results according to an embodiment of the present invention.
Figure 8:
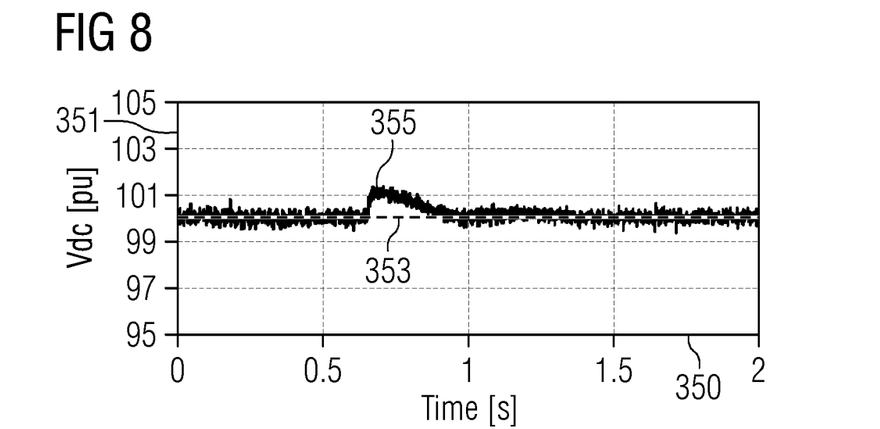
FIG. 8 schematically illustrates a coordinate system having as abscissa the time and as ordinate the voltage experimental results according to an embodiment of the present invention.
Figure 9:
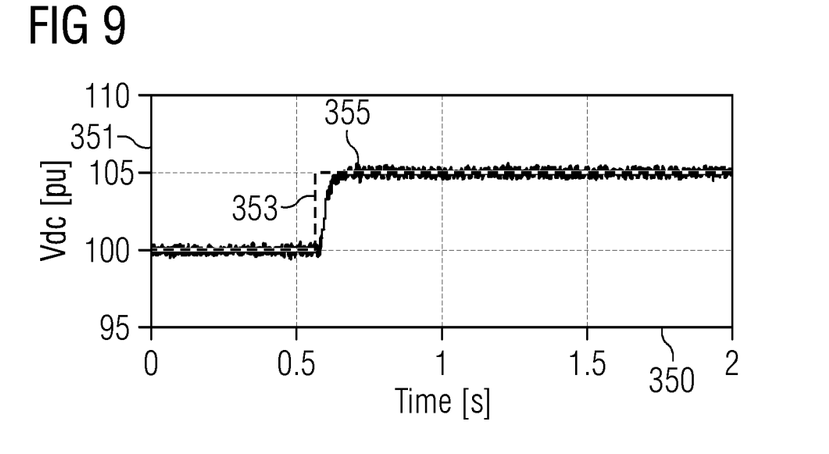
FIG. 9 schematically illustrates a coordinate system having as abscissa the time and as ordinate the voltage experimental results according to an embodiment of the present invention.
Figure 10:
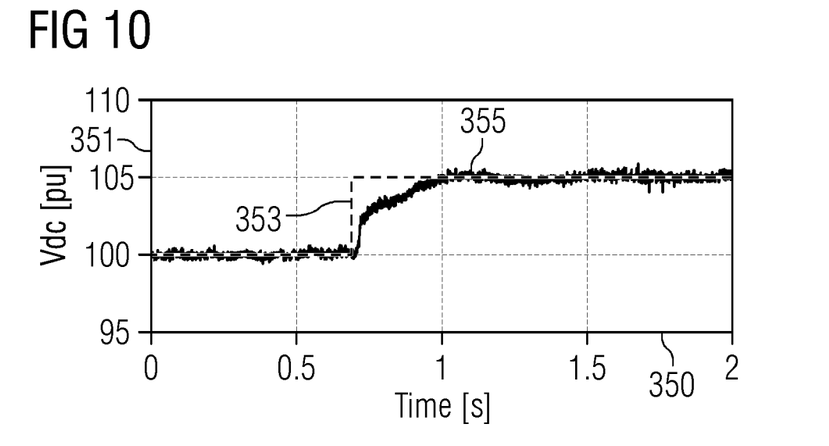
FIG. 10 schematically illustrates a coordinate system having as abscissa the time and as ordinate the voltage experimental results according to an embodiment of the present invention.
Figure 11:
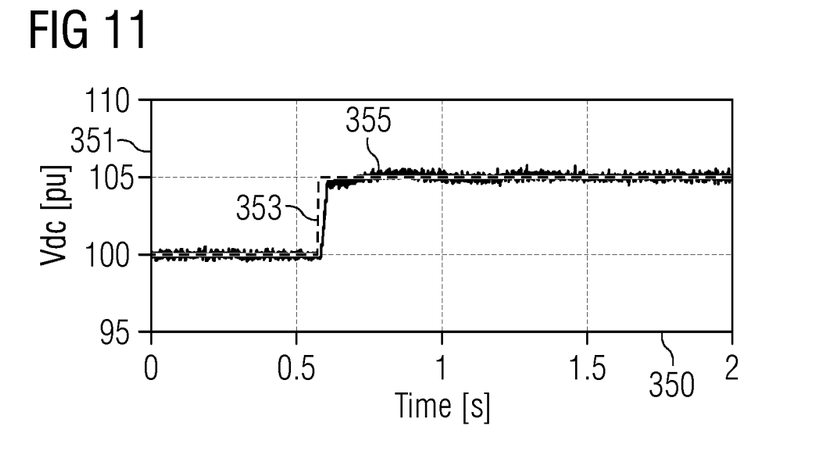
FIG. 11 schematically illustrates a coordinate system having as abscissa the time and as ordinate the voltage experimental results according to an embodiment of the present invention.
Figure 12:
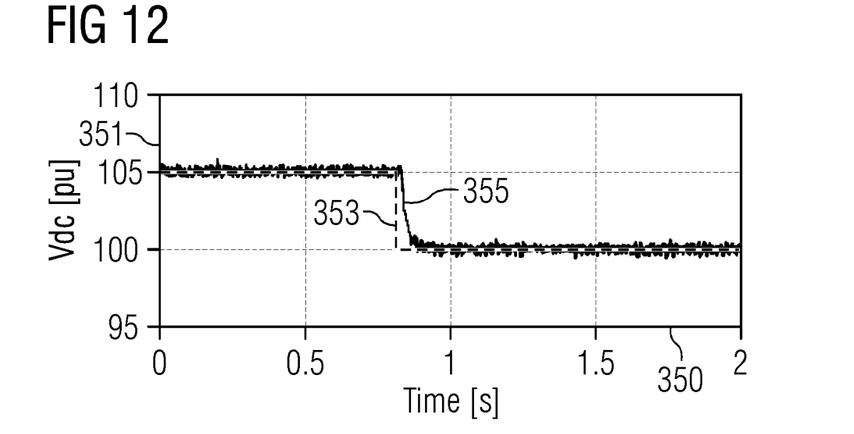
FIG. 12 schematically illustrates a coordinate system having as abscissa the time and as ordinate the voltage experimental results according to an embodiment of the present invention.
Figure 13:
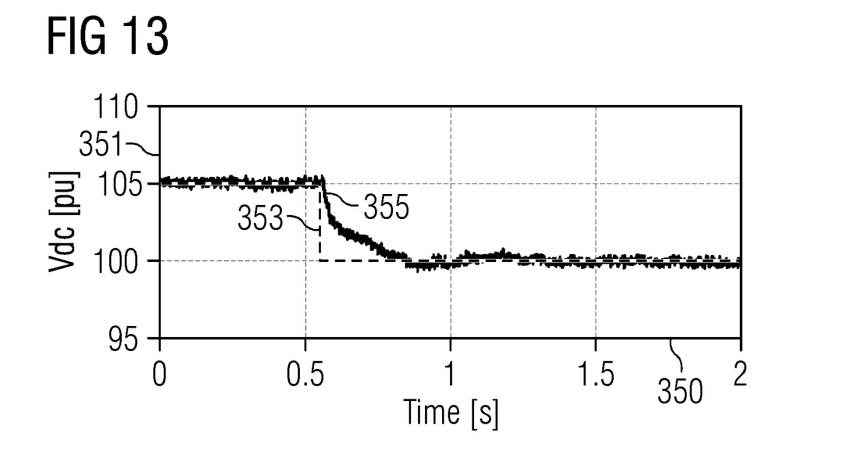
FIG. 13 schematically illustrates a coordinate system having as abscissa the time and as ordinate the voltage experimental results according to an embodiment of the present invention.
Figure 14:
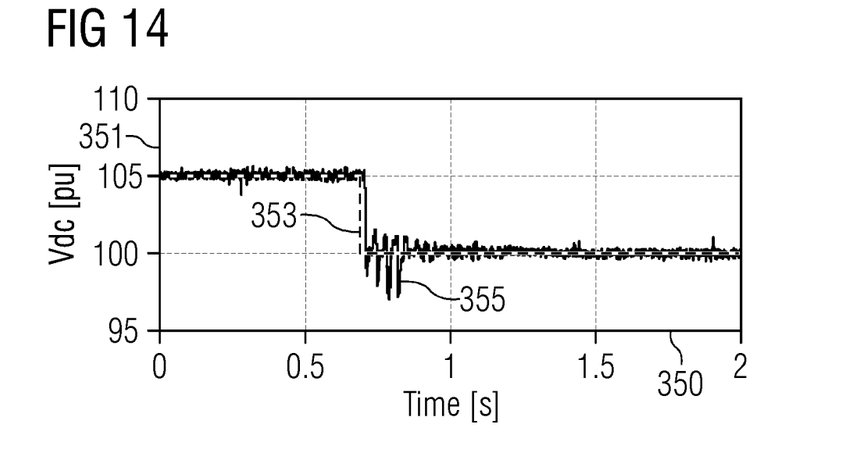
FIG. 14 illustrates experimental results of embodiments of the present invention in comparison to the conventional art.

The FIG. 2 illustrates for example (in a physical connection diagram) the DC-link 203 which is connected between a generator side converter portion 205 and a utility grid side converter portion 207. The generator side converter portion 205 is connected to a generator 209 having a rotor 211 at which plural rotor blades 213 are mounted. Upon rotation of the rotor 211, the generator 209 outputs an AC power stream 215 which is supplied to (AC input terminals of) the generator side converter portion 205. The generator side converter portion 205 is configured as an AC-DC converter which converts the AC power stream 215 to a DC power which is output at a first DC terminal 217 and a second DC terminal 219. The first DC terminal 217 is connected to a first DC bus 221 and the second DC terminal 219 is connected to a second DC bus 223. Between the two DC buses 221, 223, a capacitor 225 is connected. The DC buses 221, 223 are also connected to DC terminals 227 and 229 of the utility grid side converter portion 207. The utility grid side converter portion 207 is configured as a DC-AC converter which converts the DC power received at its DC input terminals 227, 229 to AC power which is, via a not illustrated wind turbine transformer or other wind park transformers to a utility grid 231.

The arrangement 100, again referring to FIG. 1, for controlling the DC-link-voltage V_DC (see FIG. 2) comprises a generalized predictive control module 133 which is adapted to receive as control module input values 135 a current value V_DC of the DC-link-voltage and a reference value V*_DC of the DC-link-voltage and to derive a reference value (I*_DC) of a DC current (in a static coordinate frame) based on the control module input values (collectively denominated as 135).

The arrangement 100 is configured to control a converter portion, namely a generator side converter portion 105 (or a utility grid side converter portion 107 in not illustrated embodiments), which may be similarly configured and connected as the converter portion 205, 207 illustrated in FIG. 2. The scheme illustrated in FIG. 1 represents a signal control scheme and not (necessarily) a physical connection scheme. The converters 105/107 are connected to the generator 109 and eventually cause a DC current (caused by current through the stator windings of the generator 109) (actually e.g. I_DC) flowing to the DC bus 103. Thereupon, the DC-link-voltage V_DC evolves.

The arrangement 100 further comprises an arithmetic element 136 which is receiving as arithmetic element input values 139 at least the reference value I*_DC of the DC current, a current value V_DC of the DC-link-voltage. Alternative methods may be employed to derive I*_sq from I*_DC, e.g., 136 may be a processing block. The arithmetic element (or in general processing block) 136 is adapted to calculate a q-component (I*_sq) of the reference value of the stator current in a synchronous reference frame rotating synchronously with the electrical frequency of the generator 109 connected to the generator side converter portion based on the arithmetic element input values 139, in particular applying a power balance equation.

FIG. 1 illustrates the signal flow diagram, in the case that the generator side converter portion, for example 205 illustrated in FIG. 2, is controlled. In case the utility grid side converter portion is controlled, the d-component (I*_gd) of the reference value of the grid current (index 'g' in I*_gd stands for grid) in the synchronous reference frame is derived based on the arithmetic element input values (collectively denominated 139). Further on the voltage reference V*_gdq is calculated and used to control the grid side converter portion which causes the grid current I_gdq.

When the control of the generator side converter portion 205/105 is performed, the arithmetic element input values 139 further comprise a pole pair number N_p, a mechanical rotational speed ωr of the generator 209/109 and a permanent flux linkage of the permanent magnets of the generator, nominated as ψm. The arrangement is additionally adapted by additionally using a predetermined d-component (I*_sd) of the reference value of the stator current in the synchronous reference frame, to obtain a complex reference value I*_sdq of the stator current in the synchronous reference frame. Herein, the element 141 multiplies the output of the arithmetic element 136 by ⅔ to obtain the q-component of the reference value I*_sq of the satator current.

The complex reference value I*_sdq of the stator current is supplied, together with an actual value of the stator current in the synchronous reference frame (I_sdq) to a difference element 143 which determines the current error 147.

The arrangement 100 further comprises a current controller 145 which is adapted to receive the error value 147 of the stator current output by the difference element 143 and is adapted to calculate a reference value V*_sdq of a voltage as a control signal for the generator side converter portion 105 or the grid side converter portion 107, as is illustrated in FIG. 1. The generator side converter portion 105 and the utility grid side converter portion 107 are adapted to receive the reference value V*_sdq as a control signal based on which plural controllable switches (for example IGBTs) are operated, in order to inject a DC current to the DC-link 103 corresponding to the reference value I*_DC of the voltage.

In FIG. 2, included in wind turbine 260, an embodiment 200 of an arrangement for controlling a DC-link-voltage V_DC of a DC-link 203 is illustrated which may be configured regarding control signals similar or same as the arrangement 100 illustrated in FIG. 1. The arrangement 200 is communicatively connected to the generator side converter portion 205 as well as optionally to the utility grid side converter portion 207. It supplies depending on which of the converter portions is controlled, the respective reference value V*_sdq to the respective converter portion.

Embodiments of the present invention perform a DC-link-voltage control based on generalized predictive control (GPC) which is employed for permanent magnet synchronous generator (PMSG) based wind power generation system. In general, a GPC controller, for example GPC module 133 in FIG. 1, is utilized for the DC-link-voltage control of a wind power generation system. The inputs 135 of the GPC controller are the DC-link-voltage and its reference and the output of the GPC controller is the reference value of the DC current to be injected into the DC-link bus, i.e. I*_DC.

The current reference in the synchronous reference frame is calculated based on the output of the GPC controller.

If using the machine side (generator side converter portion) to control the DC-link voltage, the q-axis current reference is calculated as:

$$I^*_{sq} = 2I^*_{DC} V_{DC}/(3 N_p \omega_r \psi_m),$$

where $N_p$, $\omega_r$, and $\psi_m$ are the pole pair number, mechanical angular rotor speed, and permanent magnet flux linkage of the PMSG (e.g. fixed control parameter or calculated online by means of an estimator/observer); If using the grid side to control the DC-link voltage, the d-axis current reference is calculated as: $I^*_{gd} = 2I_{DC} V_{DC}/(3 V_g)$, where $V_g$ is the grid voltage amplitude (e.g. measured).

The threshold of the accumulator of the GPC is adaptively adjusted to limit the current amplitude. If using the machine side to control the DC-link voltage, the threshold is adjusted according to the rotor speed; If using the grid side to control the DC-link voltage, the threshold is adjusted according to the grid voltage amplitude.

In the following, further details are given for particular embodiments to which however embodiments of the invention is not limited.

A. GPC Implementation

The DC-link bus of a PMSG wind power generation system is shown in FIG. 2. When using the machine side to control the DC-link voltage, the DC load current, i.e., IL, is treated as a disturbance. The dynamic of the DC-link voltage can be described as $$\frac{dV_{DC}}{dt} = \frac{I_C}{C} = \frac{I_{DC} - I_L}{C} \tag{1}$$

From (1) the discrete prediction equation in incremental form can be expressed as:

$$\Delta V_{DC}(k+1) = \Delta V(k) + \Delta I_{DC}(k) T_s/C - \Delta I_L(k) T_s/C \tag{2}$$

where Δ represents the incremental variables. Ts is the sampling period of the controller. C is the capacitance of the DC capacitor. k represents the current instant in a discrete time sequence. Here the incremental DC load current can be ignored since the DC load can be considered as constant when designing the GPC controller. Thus, (2) can be rewritten as the following standard form:

$$\begin{cases} \underbrace{\begin{bmatrix} \Delta V_{DC}(k+1) \\ V_{DC}(k+1) \end{bmatrix}}_{x_m(k+1)} = \underbrace{\begin{bmatrix} 1 & 0 \\ 1 & 1 \end{bmatrix}}_{A_m} \underbrace{\begin{bmatrix} \Delta V_{DC}(k) \\ V_{DC}(k) \end{bmatrix}}_{x_m(k)} + \underbrace{\begin{bmatrix} T_s/C \\ T_s/C \end{bmatrix}}_{B_m} \underbrace{\Delta I_{DC}(k)}_{\Delta u(k)} \\ y(k) = \underbrace{\begin{bmatrix} 0 & 1 \\ & C_m \end{bmatrix}}_{} \begin{bmatrix} \Delta V_{DC}(k) \\ V_{DC}(k) \end{bmatrix} \end{cases} \tag{3}$$

where xm is the extended state variable, y and u are the output and input variables, respectively. Am, Bm, and Cm are the coefficient matrices.

From (3), the prediction equation of the whole prediction horizon (N steps) can be expressed in a compact form:

$$Y = \Omega x_m(k) + F \Delta U \tag{4}$$

where $$Y = \begin{bmatrix} y(k+1) \\ y(k+2) \\ \vdots \\ y(k+N) \end{bmatrix}; \Delta U = \begin{bmatrix} \Delta u(k) \\ \Delta u(k+1) \\ \vdots \\ \Delta u(k+N-1) \end{bmatrix}; \Omega = \begin{bmatrix} C_m A_m \\ C_m A_m^2 \\ \vdots \\ C_m A_m^N \end{bmatrix};$$

$$F = \begin{bmatrix} C_m B_m & 0 & \cdots & 0 \\ C_m A_m B_m & C_m B_m & \ddots & \vdots \\ \vdots & & \ddots & \\ C_m A_m^{N-1} B_m & C_m A_m^{N-2} B_m & \cdots & C_m B_m \end{bmatrix}.$$

For GPC, the cost function is usually designed as quadratic form, thus the optimization problem can be expressed as:

$$\min_{\Delta U} J = (Y^* - Y)^T Q (Y^* - Y) + \Delta U^T R \Delta U \tag{5}$$

where $Y^*[V^*_{DC} V^*_{DC} \ldots V^*_{DC}]^T$ is the reference vector; Q=diag[Q1 Q2 QN]T and R=diag[R1 R2 RN]T are the weighting matrices of the output variables and input variables, which are related with the control performance of GPC and should both be positive semi-definite.

According to the quadratic programming theory, the optimal solution of (5) is:

$$\Delta U = (F^T Q F + R)^{-1} F^T Q [Y^* - \Omega x_m(k)] \tag{6}$$

Finally, the first element of the optimized solution is accumulated to obtain the DC current reference:

$$I^*_{DC} = \frac{1}{1 - z^{-1}} W \Delta U \tag{7}$$

where $$W = \underbrace{[1 \; 0 \; \ldots \; 0]}_{N}.$$

B. Calculation of Current Reference in Synchronous Reference Frame

The DC current reference obtained in (7) should be converted to the stator or grid current reference, then tracked by the inner current control loop. The stator or grid current reference calculation is based on the instantaneous power balance between the AC side and DC side of the converter. When using the machine side to control the DC-link voltage, the instantaneous power balance equation is:

$$V_{DC}I_{DC} = \frac{3}{2}(V_{sd}I_{sd} + V_{sw}I_{sq}) \quad (8)$$

When orienting the d-axis on the permanent magnet flux linkage and ignoring the voltage drop on the stator windings, (8) can be approximately written as:

$$V_{DC}I_{DC} \approx \frac{3}{2}N_p\omega_r\psi_m I_{sq} \quad (9)$$

Then, the q-axis current reference can be obtained as:

$$I_{sq}^* = \frac{2V_{DC}I_{DC}^*}{3N_p\omega_r\psi_m} \quad (10)$$

The q-axis current reference obtained in (10) is finally tracked by the inner current control loop, which can be either PI controller or any other control methods (example: GPC based current controller). The d-axis current is not related with the DC-link voltage control but can be controlled to achieve other targets. It should be noted that the approximately equal in (9) will not introduce any static errors due to the existence of the accumulator in (7).
Similarly, when using the grid side to control the DC-link voltage, the instantaneous power balance equation is:

$$V_{DC}I_{DC} = \frac{3}{2}(V_{gd}I_{gd} + V_{gq}I_{gq}) \quad (11)$$

When orienting the d-axis on the grid voltage, the d-axis current reference can be obtained as:

$$I_{gd}^* = \frac{2V_{DC}I_{DC}^*}{3V_g} \quad (12)$$

where Vg is the grid voltage amplitude.

C. Adaptive Threshold for AC Current Limitation

In a practical system, the AC current should be limited. If simply adding a limiter to the d- or q-axis current reference, the GPC will suffer from overshoots in transient processes. To solve this problem, the accumulator in (7) should be responsible for the AC current limitation, which works similarly as an integrator with anti-windup. To accurately limit the AC current, the threshold of the accumulator should be adaptively adjusted, due to the varying DC-link voltage and rotor speed (when the DC-link voltage is controlled by the machine side) or grid voltage (when the DC-link voltage is controlled by the grid side). The adaptive threshold is also calculated based on the instantaneous power balance, as shown in (8) and (11).
If using the machine side to control the DC-link voltage, and the q-axis current constraint being defined as Isq_low≤Isq-≤Isq_up, the threshold of the accumulator should be set as:

$$\frac{3N_p\omega_r\psi_m I_{sq\_low}}{2V_{DC}} \leq I_{DC}^* \leq \frac{3N_p\omega_r\psi_m I_{sq\_up}}{2V_{DC}} \quad (13)$$

If using the grid side to control the DC-link voltage, and the d-axis current constraint being defined as Igd_low≤Igd≤Igd_up, the threshold of the accumulator should be set as:

$$\frac{3V_g I_{gd\_low}}{2V_{DC}} \leq I_{DC}^* \leq \frac{3V_g I_{gd\_up}}{2V_{DC}} \quad (14)$$

The threshold is represented in FIG. 1 with reference sign 134, which is input to the GPC module 133.

FIGS. 3 to 14 illustrate in coordinate systems having as abscissa 350 the time and as ordinate 351 the voltage experimental results according to embodiments of the present invention in FIGS. 3, 6, 9 and 12 as well as conventionally obtained results (PI controllers) in the other figures. In all FIGS. 3 to 14, the lines 353 denote reference voltages and the lines 355 denote the actually achieved DC-link-voltage.

It can be recognized that the actually achieved voltage 355 closely resembles the reference voltage 353 in FIGS. 3, 6, 9 and 12 showing results according to embodiments of the present invention, while the actually achieved voltages 355 deviate from the reference value 355 for the conventional methods.

In the experiments leading to results in FIGS. 3, 6, 9 and 12, the DC-link voltage is controlled by the machine side, and the disturbance rejection capabilities of the proposed GPC and the conventional PI against two typical disturbances (FIG. 3, 6), i.e., rotor speed change and DC load change (FIG. 9, 12), are compared. Meanwhile, the dynamic performances of the proposed GPC and the conventional PI to track changing DC-link voltage references are also compared. From FIGS. 1 to 14, it can be observed that the disturbance rejection capability of the conventional PI can be improved by using large parameters, but still not as good as the proposed GPC. As for the dynamic performances, the proposed GPC provides smooth and fast transient processes for both the two dynamic tests. However, the PI with smaller parameters suffers from slow and unsmooth transient processes, while the PI with larger parameters faces overshoot problems when the DC-link voltage steps down.

Therefore, it can be observed that the proposed GPC-based DC-link voltage control strategy has better disturbance rejection capability than the conventional PI, even when quite large PI parameters are used. It should be noted that if further increasing the PI parameters, the overshoots in dynamic tests will be too large to properly track the DC-link voltage reference change, which should be avoided in practical systems.

Several advantages can be achieved with embodiments of the present invention which are listed below. It should, however, be noted that not all advantages are necessarily obtained by embodiments of the present invention:

1) Compared with the PI controller, the embodiments of the present invention may have better disturbance rejection capability, which leads to more stable DC-link voltage and benefits the DC capacitor life and the AC current quality.

2) Compared with the FCS-MPC, the embodiments of the present invention may have fixed switching frequency, thus the current harmonics and losses can be reduced. Meanwhile, embodiments of the present invention can inherently avoid the static control errors caused by the parameter mismatch.

3) Compared with the deadbeat predictive control, the embodiments of the present invention may avoid the DC load power estimation, thus the control system is simplified. Meanwhile, the embodiments of the present invention may inherently avoid the static control errors caused by the parameter mismatch. In addition, the embodiments of the present invention may avoid the fixed-step gradually approaching manner, thus the dynamic performance is improved.

Embodiments of the present invention may exhibit the following properties:

1) Embodiments of the present invention may be based on the generalized predictive control (GPC), which predicts the future states of the DC-link voltage, with a long prediction horizon. Thus, the optimized DC current reference can be obtained by solving an optimization problem as shown in (5). Compared with the PI controller, which relies on the integrating process of the past control errors, the GPC-based DC-link voltage control inherently has advantages in disturbance rejection capability.

2) Embodiments of the present invention may utilize a cascaded control structure, and only the outer loop, i.e., the DC-link voltage control loop, is given in embodiments of the invention. Thus, any existing current controllers can be utilized in the inner loop, including the conventional PI controller with PWM module, which leads to fixed switching frequency and low current harmonics. Meanwhile, as a part of the GPC controller, the accumulator shown in (7) can inherently remove the static control errors caused by the parameter mismatch, without the need of auxiliary controllers.

3) The accumulator of the GPC can remove the static control errors; thus the DC load power estimation is not required in the implementation of the GPC. Meanwhile, the weighting matrices Q and R in (5) can automatically balance the DC-link voltage tracking and the DC current limiting, thus the fixed-step gradually approaching manner is not required.

Embodiments of the present invention may provide high-performance DC-link voltage control for the PMSG-based wind power generation system. The improved DC-link voltage (less fluctuation when facing disturbances) can extend the DC capacitor life. The method provides increased flexibility to meet the requirements for dc-link voltage control under various operating modes of a wind turbine, examples are active and/or reactive power production, and grid fault ride through. Considering that the DC-link voltage ripples can cause harmonic distortions in the AC current, embodiments of the invention can also reduce the AC current harmonics and the losses of the machine.

In addition, embodiments of the invention can also be applied to other grid-connected power electronic devices, e.g., PV systems, PWM rectifiers, high voltage direct current transmission (HVDC), etc.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. An arrangement for controlling a DC-link-voltage of a DC-link connected between a generator side converter portion and a utility grid side converter portion of a wind turbine, the arrangement comprising:
    a generalized predictive control module adapted:
        to receive as control module input values a measured value of the DC-link-voltage and a reference value of the DC-link-voltage, and
        to derive a reference value of a DC current based on the control module input values, the reference value of a DC current defining the DC current to be injected into the DC-link,
    wherein the arrangement is adapted to control the generator side converter portion or the utility grid side converter portion based on the reference value of the DC current, and further comprising an arithmetic element receiving as arithmetic element input values at least:
        the reference value of the DC current,
        the measured value of the DC-link-voltage,
    the arithmetic element being adapted to calculate a q-component of the reference value of the stator current or a d-component value of the reference value of the grid current in a synchronous reference frame based on the arithmetic element input values;
        wherein, if control of the generator side converter portion is performed, the arithmetic element input values further comprise:
        a pole pair number;
        a mechanical rotational speed of the generator;
        a permanent flux linkage of the permanent magnets of the generator;
    wherein the arithmetic element is adapted to calculate the q-component of the reference value of the stator current in the synchronous reference frame, wherein the arrangement is adapted by additionally using a predetermined d-component of the reference value of the stator current in the synchronous reference frame, to obtain a complex reference value of the stator current in the synchronous reference frame, and/or
        wherein, if control of the grid side converter portion is performed, the arithmetic element input values further comprise:
        an amplitude of a grid voltage,
    wherein the arithmetic element is adapted to calculate the d-component of the reference value of the grid current in the synchronous reference frame, wherein the arrangement is adapted by additionally using a predetermined q-component of the reference value of the grid current in the synchronous reference frame, to obtain a complex reference value of the grid current in the synchronous reference frame.

2. The arrangement according to claim 1, wherein a power balance equation is applied.

3. The arrangement according to claim 1, further comprising a current controller adapted:
    to receive as current controller input which is based on a complex reference value of the stator current in the synchronous reference frame, and
    to calculate a reference value of a voltage as control signal for the generator side converter portion.

4. The arrangement according to claim 1, wherein the generator side converter portion or the utility grid side converter portion are adapted to receive the reference value of the voltage as control signal, based on which plural controllable switches are operated, in order to obtain the required stator or grid current corresponding to the complex reference value, and finally the required DC current is injected to the DC-link buses.

5. The arrangement according to claim 1, wherein the generalized predictive control module is adapted to apply a discrete prediction equation of the DC-voltage as a function of the current value of the DC current injected into the DC-link, a disturbance current and a capacitance of a capacitor of the DC-link.

6. The arrangement according to claim 1,
wherein discrete prediction equation is given in incremental form
wherein the DC-voltage is predicted over plural discrete time steps via a matrix equation.

7. The arrangement according to claim 1, wherein the generalized predictive control module is adapted to solve an optimization problem using a cost function,
involving minimization of an error of the DC-link-voltage,
wherein the solution is obtained by applying quadratic programming theory using a matrix equation,
wherein as solution a vector of increments of the reference value of the DC current is obtained.

8. The arrangement according to claim 1, wherein the generalized predictive control module comprises an accumulator being adapted to accumulate an element of the vector of increments in order to obtain the reference value of a DC current.

9. The arrangement according to claim 8, wherein the accumulator is adapted to perform a limitation such that the reference value of the DC current is limited to lie within a predefined value range, in order to achieve AC current limitation to predefined AC current limits.

10. A wind turbine, comprising:
a permanent magnet, synchronous generator mechanically coupled to a rotor at which plural rotor blades are mounted;
a generator side converter portion, having an AC-DC-converter, electrically connected to AC output terminals of the generator;
a DC-link electrically connected to DC output terminals of the generator side converter portion;
a grid side converter portion, having an DC-AC-converter, having DC terminals electrically connected to the DC-link and having AC terminals electrically connectable to a utility grid; and
the arrangement according to claim 1 connected to control the generator side converter portion or the grid side converter portion.

11. A method of controlling a DC-link-voltage of a DC-link connected between a generator side converter portion and a utility grid side converter portion of a wind turbine, the method comprising:
using a generalized predictive control module;
receiving, by the generalized predictive control module, as control module input values a measured value of the DC-link-voltage and a reference value of the DC-link-voltage;
deriving, by the generalized predictive control module, a reference value of a DC current based on the control module input values, the reference value of a DC current defining the DC current to be injected into the DC-link; and
controlling the generator side converter portion and/or the utility grid side converter portion based on the reference value of the DC current;
the method further comprising:
receiving as arithmetic element input values at least:
the reference value of the DC current,
the measured value of the DC-link-voltage,
calculating a q-component of the reference value of the stator current or a d-component value of the reference value of the grid current in a synchronous reference frame based on the arithmetic element input values;
wherein, if control of the generator side converter portion is performed, the arithmetic element input values further comprise:
a pole pair number;
a mechanical rotational speed of the generator;
a permanent flux linkage of the permanent magnets of the generator;
wherein the q-component of the reference value of the stator current in the synchronous reference frame is calculated, wherein a predetermined d-component of the reference value of the stator current in the synchronous reference frame is additionally used, to obtain a complex reference value of the stator current in the synchronous reference frame, and/or
wherein, if control of the grid side converter portion is performed, the arithmetic element input values further comprise:
an amplitude of a grid voltage,
wherein the d-component of the reference value of the grid current in the synchronous reference frame is calculated, wherein a predetermined q-component of the reference value of the grid current in the synchronous reference frame is additionally used, to obtain a complex reference value of the grid current in the synchronous reference frame.

\* \* \* \* \*